US010056617B2

(12) United States Patent
Hashimoto et al.

(10) Patent No.: US 10,056,617 B2
(45) Date of Patent: Aug. 21, 2018

(54) SECONDARY BATTERY

(71) Applicant: TOYOTA JIDOSHA KABUSHIKI KAISHA, Aichi-ken (JP)

(72) Inventors: Tatsuya Hashimoto, Osaka (JP); Keisuke Ohara, Osaka (JP); Yuji Yokoyama, Moriguchi (JP); Yusuke Fukumoto, Toyonaka (JP)

(73) Assignee: TOYOTA JIDOSHA KABUSHIKI KAISHA, Toyota-shi, Aichi-ken ( * ) Notice: Subject to any disclaimer, the term of this patent is extended or adjusted under 35 U.S.C. 154(b) by 145 days.

(21) Appl. No.: 14/909,366

(22) PCT Filed: Jul. 30, 2014

(86) PCT No.: PCT/IB2014/001408
§ 371 (c)(1),
(2) Date: Feb. 1, 2016

(87) PCT Pub. No.: WO2015/015274
PCT Pub. Date: Feb. 5, 2015

(65) Prior Publication Data
US 2016/0181619 A1    Jun. 23, 2016

(30) Foreign Application Priority Data
Aug. 2, 2013    (JP) .................................. 2013-161707

(51) Int. Cl.
*H01M 4/62*    (2006.01)
*H01M 4/36*    (2006.01)
(Continued)

(52) U.S. Cl.
CPC ........... *H01M 4/628* (2013.01); *H01M 2/345* (2013.01); *H01M 4/13* (2013.01); *H01M 4/366* (2013.01);
(Continued)

(58) Field of Classification Search
CPC .......... H01M 2/34; H01M 2/345; H01M 4/36; H01M 4/366; H01M 4/62; H01M 4/628;
(Continued)

(56) References Cited

U.S. PATENT DOCUMENTS

2003/0113610 A1* 6/2003 Evans ................. H01M 4/8605
429/493
2014/0248537 A1* 9/2014 Hayashi ................ H01M 4/625
429/217

FOREIGN PATENT DOCUMENTS

JP    2008-034557 A    2/2008
JP    2012-084346 A    4/2012
(Continued)

OTHER PUBLICATIONS

International Search Report and Written Opinion for PCT/IB2014/001408 dated Nov. 24, 2014.

*Primary Examiner* — Karie O'Neill Apicella
(74) *Attorney, Agent, or Firm* — Sughrue Mion, PLLC

(57) ABSTRACT

A secondary battery includes a wound electrode assembly in which a positive electrode sheet, a negative electrode sheet and a separator are stacked and wound. The positive electrode sheet is provided with a long positive electrode current collector and a positive electrode active material layer. The positive electrode active material layer is disposed on the positive electrode current collector. The negative electrode sheet is provided with a long negative electrode current collector and a negative electrode active material layer. The negative electrode active material layer is disposed on the negative electrode current collector. The separator is interposed between the positive electrode sheet and the negative electrode sheet. The negative electrode current collector has a first active material layer-free region at one edge of the negative electrode current collector in a winding direction of an axis of the wound electrode assembly. The first active (Continued)

material layer-free region is a region where the negative electrode active material layer is not formed. The positive electrode current collector has a second active material layer-free region at one edge of the positive electrode current collector in a winding direction of an axis of the wound electrode assembly. The second active material layer-free region is a region where the positive electrode active material layer is not formed. The negative electrode current collector and the positive electrode current collector are disposed, with the first active material layer-free region and the second active material layer-free region being projected toward opposite sides in the winding direction of the axis of the wound electrode assembly. A width of the negative electrode active material layer is wider than a width of the positive electrode active material layer and a bacterial cellulose is disposed in at least a surface layer of the negative electrode active material layer that faces the second active material layer-free region.

8 Claims, 6 Drawing Sheets

(51) Int. Cl.
  *H01M 10/42* (2006.01)
  *H01M 10/0525* (2010.01)
  *H01M 10/0567* (2010.01)
  *H01M 10/0587* (2010.01)
  *H01M 2/34* (2006.01)
  *H01M 4/13* (2010.01)
  *H01M 10/04* (2006.01)

(52) U.S. Cl.
  CPC ....... *H01M 4/622* (2013.01); *H01M 10/0525* (2013.01); *H01M 10/0567* (2013.01); *H01M 10/0587* (2013.01); *H01M 10/4235* (2013.01); *H01M 10/0431* (2013.01); *H01M 2200/20* (2013.01)

(58) Field of Classification Search
  CPC ............. H01M 10/42; H01M 10/4235; H01M 10/0525; H01M 10/0567; H01M 10/0587
  See application file for complete search history.

(56) References Cited

FOREIGN PATENT DOCUMENTS

| WO | 2013/018196 A1 | 2/2013 | |
|---|---|---|---|
| WO | WO 2013018196 A1 * | 2/2013 | .......... H01M 2/1077 |
| WO | 2013/042720 A1 | 3/2013 | |

* cited by examiner

SECONDARY BATTERY

BACKGROUND OF THE INVENTION

1. Field of the Invention

The invention relates to a secondary battery. More particularly, the invention relates to a secondary battery that is provided with a wound electrode assembly in which a positive electrode sheet, a negative electrode sheet, and a separator are stacked and wound. The positive electrode sheet is provided with a positive electrode active material layer on a long positive electrode current collector. The negative electrode sheet is provided with a negative electrode active material layer on a long negative electrode current collector. The separator is interposed between the positive electrode sheet and the negative electrode sheet.

2. Description of Related Art

Secondary batteries such as lithium ion secondary batteries and nickel hydride batteries have in recent years been preferentially used as vehicular power sources and power sources for personal computers and portable and mobile electronic devices. Lithium ion secondary batteries in particular are light weight and have a high energy density. As a consequence, they are growing in importance as, for example, high-output power sources for installation in vehicles and as power sources for power storage systems. One type of conventional battery has a battery structure that is provided with a wound electrode assembly made by stacking a long positive electrode sheet and negative electrode sheet with a separator interposed therebetween and winding this into a spiral configuration. The reaction area between the positive and negative electrodes can be increased by using a spiral configuration for the electrode assembly. This makes it possible to raise the energy density and obtain high outputs.

The positive electrode sheet in this wound electrode assembly is generally fabricated by forming positive electrode active material layers by supplying a positive electrode active material layer-forming composition containing a positive electrode active material to both sides of a positive electrode current collector. This positive electrode active material layer-forming composition can be prepared, for example, as a paste or slurry. The negative electrode sheet is fabricated by forming negative electrode active material layers by supplying a negative electrode active material layer-forming composition containing a negative electrode active material to both sides of a negative electrode current collector.

Here, in the case of high-output service such as installation in a vehicle, an uncoated region where the active material layer is not formed (the active material layer-free region) is provided on these electrode sheets (i.e., the positive electrode sheet and/or the negative electrode sheet) and is used as a current collection region. In order to raise the current collection efficiency, this uncoated region is disposed as a strip on both sides at one edge in the width direction that is orthogonal to the length direction of the electrode sheet. In addition, the uncoated regions of the two electrode sheets are disposed in a staggered manner whereby the uncoated region of the positive electrode sheet and the uncoated region of the negative electrode sheet project out toward opposite sides in the width direction, and the wound electrode assembly is then fabricated by winding using these electrode sheets. When a secondary battery provided with a wound electrode assembly having such a configuration is subjected to repetitive charge/discharge, the expansion and contraction of the active material accompanying charge/discharge can cause deformation, e.g., buckling and so forth, in the wound electrode assembly, and the properties may then deteriorate. In view of these circumstances, the invention provides a secondary battery that exhibits a high ability to withstand charge/discharge cycling.

SUMMARY OF THE INVENTION

One aspect of the invention relates to a secondary battery. The secondary battery includes a wound electrode assembly in which a positive electrode sheet, a negative electrode sheet and a separator are stacked and wound. The positive electrode sheet is provided with a long positive electrode current collector and a positive electrode active material layer. The positive electrode active material layer is disposed on the positive electrode current collector. The negative electrode sheet is provided with a long negative electrode current collector and a negative electrode active material layer. The negative electrode active material layer is disposed on the negative electrode current collector. The separator is interposed between the positive electrode sheet and the negative electrode sheet. The negative electrode current collector has a first active material layer-free region at one edge of the negative electrode current collector in a winding direction of an axis of the wound electrode assembly. The first active material layer-free region is a region where the negative electrode active material layer is not formed. The positive electrode current collector has a second active material layer-free region at one edge of the positive electrode current collector in a winding direction of an axis of the wound electrode assembly. The second active material layer-free region is a region where the positive electrode active material layer is not formed. The negative electrode current collector and the positive electrode current collector are disposed, with the first active material layer-free region and the second active material layer-free region being projected toward opposite sides in the winding direction of the axis of the wound electrode assembly. A width of the negative electrode active material layer is wider than a width of the positive electrode active material layer and a bacterial cellulose is disposed in at least a surface layer of the negative electrode active material layer that faces the second active material layer-free region.

The bacterial cellulose in this Specification refers to any cellulose produced by a microorganism (typically bacteria such as the acetic acid bacteria). Bacterial cellulose has a fiber diameter of, for example, 10 nm to 100 nm, which is one one-hundredth to one ten-thousandth that of cellulose of plant origin. As indicated above, in the aforementioned aspect bacterial cellulose is disposed in at least a surface layer of the negative electrode active material layer that faces the active material layer-free region (second active material layer-free region) of the positive electrode current collector. When this structure is implemented, the nanosize microfine indentation of the bacterial cellulose inhibits the deformation (for example, buckling) that is caused by expansion/contraction during charge/discharge. As a consequence, deformation of the wound electrode assembly is suppressed in this aspect even during repetitive charge/discharge. The result is then a mitigation of the phenomenon of property deterioration by the secondary battery that is caused by deformation of the wound electrode assembly. This property deterioration by the secondary battery refers, for example, to a decline in the capacity retention rate post-cycling.

In the aforementioned aspect, the average particle diameter of the bacterial cellulose may be larger than or equal to 0.01 μm and smaller than or equal to 0.25 μm. This average particle diameter is derived from a laser scattering/diffraction analysis of the bacterial cellulose. An even better suppression of the property deterioration of the secondary battery can be obtained by having the average particle diameter d of the bacterial cellulose be in the indicated range.

In the aforementioned aspect, a bacterial cellulose layer containing a bacterial cellulose may be formed over the whole area of the surface layer of the negative electrode active material layer. The disposition of the bacterial cellulose layer over the whole area of the surface layer of the negative electrode active material layer can inhibit precipitation of the charge carrier of the secondary battery during low temperatures and high output. This can inhibit the precipitation of lithium in the case of lithium ion secondary batteries.

In the aforementioned aspect, the average thickness of the bacterial cellulose layer may be larger than or equal to 1 μm and smaller than or equal to 10 μm. When the average thickness of the bacterial cellulose layer is in the indicated range, the property deterioration of the secondary battery can be avoided while precipitation of the charge carrier during low temperatures and high output can be inhibited. In the case of, for example, lithium ion secondary batteries, the property deterioration of the lithium ion secondary battery can be avoided while inhibiting the precipitation of lithium during low-temperature high output.

In the aforementioned aspect, a bacterial cellulose-containing region that contains a bacterial cellulose may be formed at the edge of the negative electrode active material layer on a side where the first active material layer-free region is not formed in the axis of the winding direction of the wound electrode assembly. By disposing a bacterial cellulose-containing region at the edge of the negative electrode active material layer, precipitation of the metal originating from the positive electrode active material during high-temperature storage can be inhibited.

In the aforementioned aspect, in the bacterial cellulose-containing region, the negative electrode active material layer may have a region facing the positive electrode active material layer and a region that does not face the positive electrode active material layer. In addition, the width W of the region facing the positive electrode active material layer may be 1 mm≤W≤3 mm. When the width W of the bacterial cellulose-containing region is in the indicated range, the property deterioration of the secondary battery can be avoided while inhibiting metal precipitation during high-temperature storage.

In the aforementioned aspect, the secondary battery may have a battery case, an outer terminal, and a current-interrupt mechanism. The battery case houses the wound electrode assembly. A nonaqueous electrolyte solution is also housed in the battery case. This nonaqueous electrolyte solution contains a gas generator that reacts and generates a gas at or above a pre-established voltage. The outer terminal is disposed in the battery case and the outer terminal is electrically connected to the electrode assembly. The current-interrupt mechanism interrupts the electrical connection between the electrode assembly and the outer terminal when the internal pressure in the battery case rises to reach or exceed a pre-established pressure.

In the aforementioned aspect, a bacterial cellulose is disposed in the surface layer of the negative electrode active material layer. Precipitation of the charge carrier during low-temperature high output is suppressed as a result. The precipitation of lithium is suppressed in the case of lithium ion secondary batteries. As a consequence, the amount of gas generation by the gas generator can be well maintained and a favorable operation of the current-interrupt mechanism is made possible.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A secondary battery according to an embodiment of the invention is described herebelow based on the figures. The secondary battery is described here using the example of a lithium ion secondary battery. The same numerals are assigned as appropriate to components and locations that have the same function. Each of the figures is a schematic depiction and does not necessarily reflect the actual object. Each figure shows an example, and, unless specifically indicated otherwise, the invention is not limited to or by the figures.

In this Specification, a "secondary battery" generally denotes a battery capable of being repetitively charged. This secondary battery encompasses, so-called storage batteries such as lithium secondary batteries (typically lithium ion secondary batteries) and nickel hydride batteries. In this Specification, a "lithium ion secondary battery" denotes a secondary battery that utilizes the lithium ion as the charge carrier and that realizes charging and discharge by the movement of charge associated with the lithium ion between the positive and negative electrodes.

Figure 1:
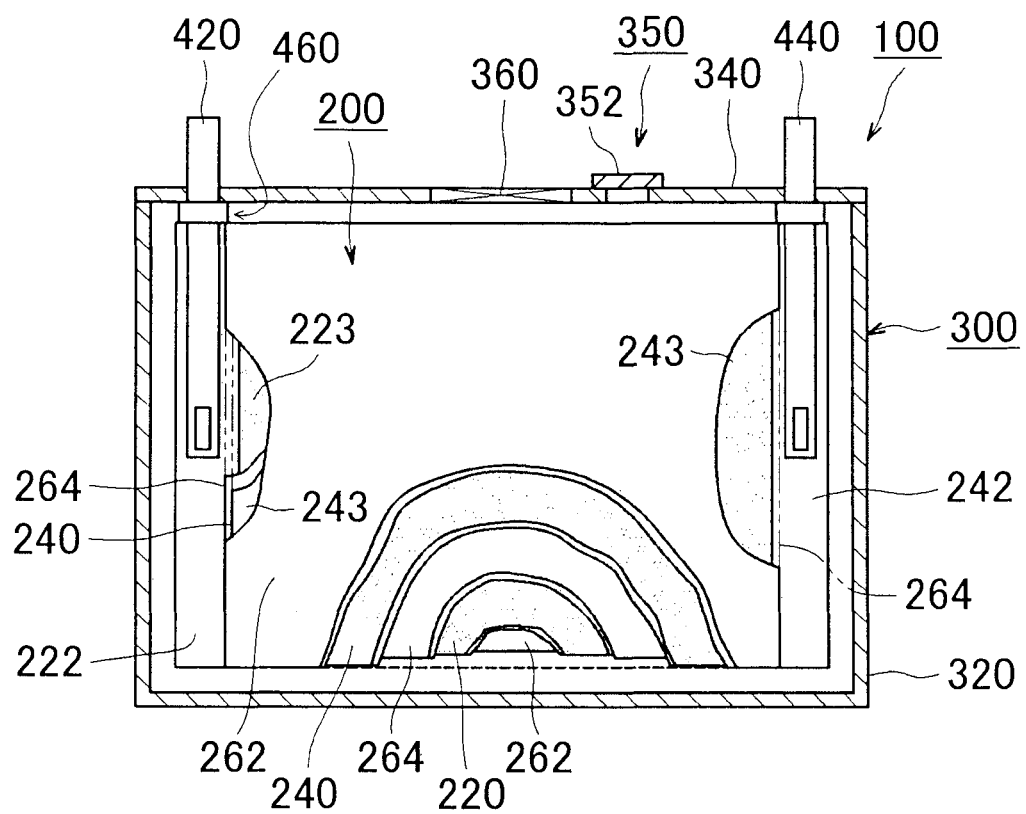
FIG. 1 is a diagram that shows an example of the structure of a lithium ion secondary battery.
Figure 2:
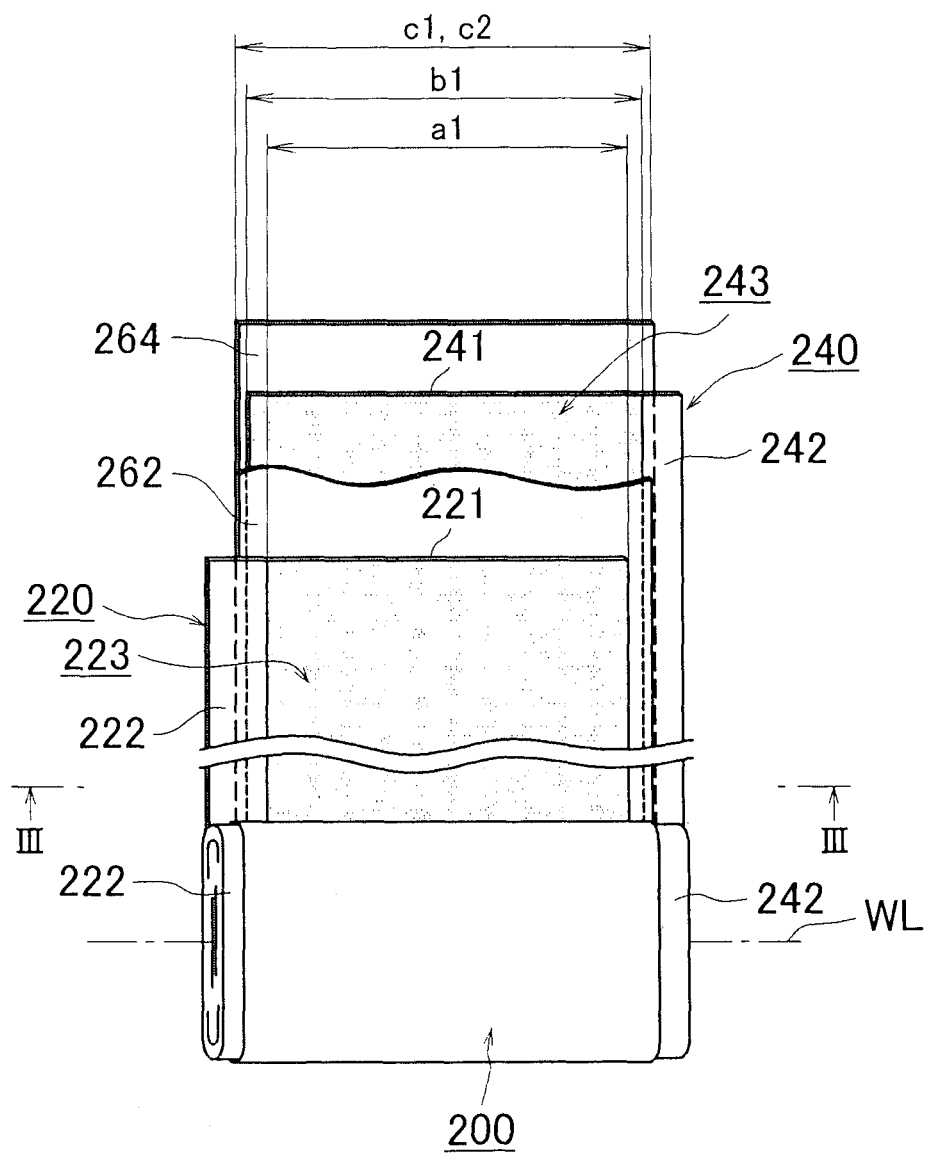
FIG. 2 is a diagram that shows a wound electrode assembly in a lithium ion secondary battery.
Figure 3:
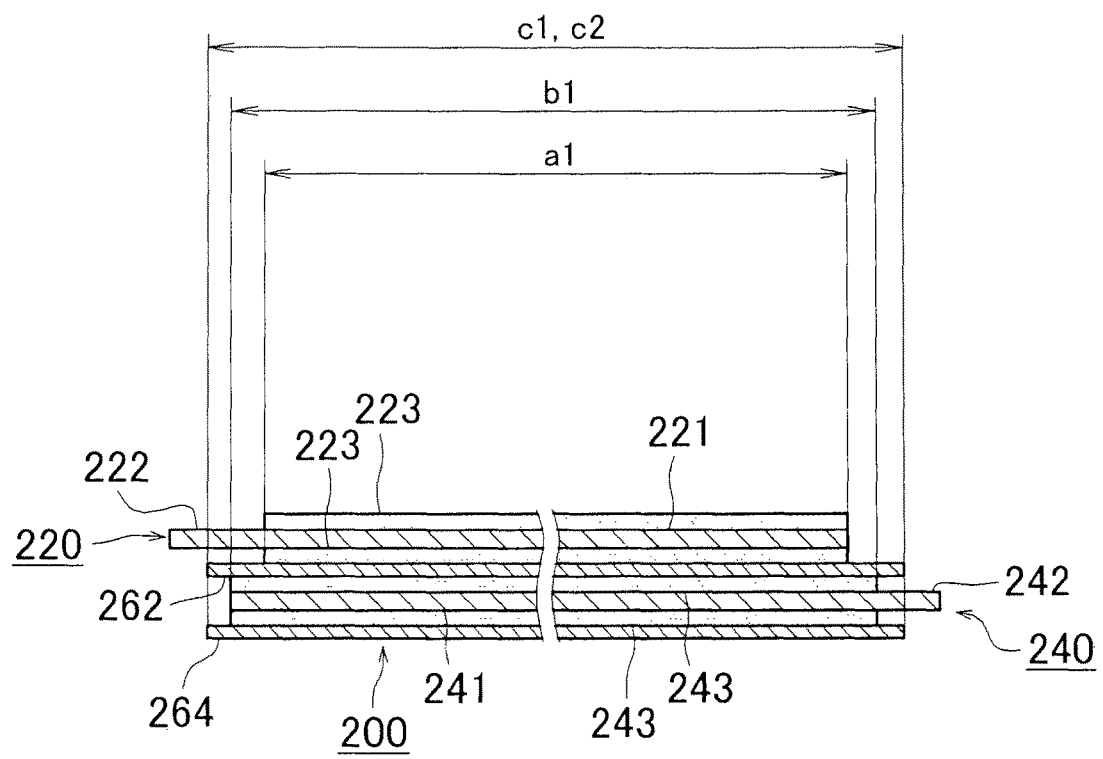
FIG. 3 is a cross-sectional diagram that shows the cross section in FIG. 2.

FIG. 1 shows a lithium ion secondary battery 100. As shown in FIG. 1, this lithium ion secondary battery 100 is provided with a wound electrode assembly 200 and a battery case 300. FIG. 2 is a diagram that shows the wound electrode assembly 200. FIG. 3 shows the cross section in FIG. 2.

The lithium ion secondary battery 100 according to an embodiment of the invention is constructed in a flat rectangular battery case (i.e., an outer container) 300 as shown in FIG. 1. As shown in FIG. 2, a flat wound electrode assembly 200 is housed in the battery case 300 of the lithium ion secondary battery 100 along with a liquid electrolyte (electrolyte solution) that is not shown.

The battery case 300 is constructed of a case main body 320 and a closure plate (a lid) 340. The case main body 320 is a box-shaped case that has an opening at one end, i.e., it is a right-angled parallelepiped case that has a bottom. This one end corresponds to the upper end under the usual conditions of use of the battery 100. The closure plate 340 is composed of a rectangular plate member. The opening is closed by the attachment of this rectangular plate member to the opening.

The material of the battery case 300 may be the same as that heretofore used in sealed batteries and is not particularly limited. The battery case 300 is preferably composed mainly of a metal that is light and has a good thermal conductivity. This metal can be exemplified by aluminum, stainless steel, and nickel-plated steel. The battery case 300 (the case main body 320 and the closure plate 340) according to this embodiment is made of aluminum or an alloy that is mainly aluminum.

As shown in FIG. 1, a positive electrode terminal 420 and a negative electrode terminal 440 are formed in the closure plate 340 for external connection. A thin-walled safety valve 360 and a liquid fill port 350 are formed between these two terminals 420 and 440 in the closure plate 340. This safety valve 360 is Constructed to release the internal pressure in the battery case 300 when the internal pressure in the battery case 300 rises to reach or exceed a prescribed level. The liquid fill port 350 in FIG. 1 is sealed by the sealing member 352 after liquid filling has been carried out.

As shown in FIG. 2, the wound electrode assembly 200 (electrode assembly) is provided with a long sheet-shaped positive electrode (the positive electrode sheet 220), a long sheet-shaped negative electrode (the negative electrode sheet 240) in the same fashion as the positive electrode sheet 220, and a total of two sheets of a long sheet-shaped separator (the separators 262 and 264).

The positive electrode sheet 220 is provided with a strip-shaped positive electrode current collector 221 and a positive electrode active material layer 223. For example, a metal foil suitable for use in a positive electrode can be suitably used for the positive electrode current collector 221. In this embodiment, a strip-shaped aluminum foil having a thickness of about 15 μm is used as the positive electrode current collector 221. The positive electrode current collector 221 has an active material layer-free region (typically an uncoated region) 222 where the positive electrode active material layer 223 has not been formed, at one edge in the width direction that is orthogonal to the length direction of the positive electrode current collector 221. The positive electrode active material layer 223 is formed so an active material layer-free region 222 is substantially not present at the other edge. In the example shown in the figure, a positive electrode active material layer 223 is supported on both sides of the positive electrode current collector 221, with the exception of the active material layer-free region 222 disposed on the positive electrode current collector 221. The positive electrode active material layer 223 contains, for example, a positive electrode active material, an electroconductive material, and a binder.

In this Specification, the "active material layer-free region is substantially not present" contains that an active material layer-free region 222 is not intentionally provided. Accordingly, for example, even when an active material layer-free region 222 has not been provided, the positive electrode current collector 221 may subsequently extend out due to some unintended factor and a microscopic active material layer-free region may be produced. Such a circumstance is encompassed by the "active material layer-free region is substantially not formed". Or, the positive electrode active material layer 223 may undergo shrinkage and this can produce a microscopic active material layer-free region. This circumstance is also encompassed by the "active material layer-free region is substantially not formed".

The materials used as positive electrode active materials in lithium ion secondary batteries can be used for the positive electrode active material. The positive electrode active material can be exemplified by lithium transition metal complex oxides. The lithium transition metal complex oxides can be exemplified by lithium nickel cobalt manganese complex oxide ($LiNiCoMnO_2$), lithium nickel oxide ($LiNiO_2$), lithium cobalt oxide ($LiCoO_2$), and lithium manganese oxide ($LiMn_2O_4$). The $LiMn_2O_4$ has, for example, a spinel structure. The $LiNiO_2$ and $LiCoO_2$ have a layered rock salt structure. The positive electrode active material present in the positive electrode active material layer 223 is described in detail below.

For example, a particulate carbon material can be mixed as an electroconductive material into the positive electrode active material. This particulate carbon material can be exemplified by carbon blacks such as acetylene black (AB) and Ketjen black and by others such as graphite and so forth. A binder may be added in addition to the positive electrode active material and the electroconductive material. This binder can be exemplified by polyvinylidene fluoride (PVDF) and styrene-butadiene rubber (SBR). A positive electrode mixture (paste) can be prepared by dispersing these in a suitable dispersion medium and mixing. The positive electrode active material layer 223 is formed by coating this positive electrode mixture on the positive electrode current collector 221, drying, and pressing to a pre-established thickness.

As shown in FIG. 2, the negative electrode sheet 240 is provided with a strip-shaped negative electrode current collector 241 and a negative electrode active material layer 243. For example, a metal foil suitable for use in a negative electrode can be suitably used for the negative electrode current collector 241. In this embodiment, a strip-shaped copper foil with a thickness of about 10 μm is used for the negative electrode current collector 241. The negative electrode current collector 241 has an active material layer-free region (typically an uncoated region) 242 where the negative electrode active material layer 243 has not been formed, at one edge in the width direction that is orthogonal to the length direction of the negative electrode current collector 241. The negative electrode active material layer 243 is formed so an active material layer-free region 242 is substantially not provided at the other edge. The negative electrode active material layer 243 is supported on both sides of the negative electrode current collector 241, with the exception of the active material layer-free region 242 disposed on the negative electrode current collector 241. The negative electrode active material layer 243 contains, for example, a negative electrode active material, a thickener, and a binder.

In this Specification, the "active material layer-free region is substantially not formed" means that the active material layer-free region 242 is not intentionally, provided. Accordingly, for example, even when the active material layer-free region 242 has not been provided, the negative electrode current collector 241 may subsequently extend out due to some unintended factor and a microscopic active material layer-free region may be produced. Such a circumstance is encompassed by "active material layer-free region is substantially not formed". Or, the negative electrode active material layer 243 may undergo shrinkage and this can produce a microscopic active material layer-free region. This circumstance is also encompassed by "active material layer-free region is substantially not formed".

One or two or more of the materials heretofore used in lithium ion secondary batteries can be used without particular limitation as the negative electrode active material. Favorable examples of the negative electrode active material are carbonaceous materials such as graphite carbon and amorphous carbon, lithium transition metal oxides, and lithium transition metal nitrides.

A binder may also be added to the negative electrode active material. The binder is, for example, PVDF or SBR. A thickener may also be added to the negative electrode active material and the binder. This thickener can be exemplified by carboxymethyl cellulose (CMC), polyvinyl alcohol (PVA), and ethylene-vinyl alcohol copolymer (EVOH). The thickener present in the negative electrode active material layer 243 is described in detail below. Just as for the positive electrode, a negative electrode mixture (paste) can be prepared by dispersing these constituent components of the negative electrode active material layer in a suitable dispersion medium and mixing. The negative electrode active material layer 243 is formed by coating this negative electrode mixture on the negative electrode current collector 241, drying, and pressing to a pre-established thickness.

As shown in FIG. 2 and FIG. 3, the separators 262 and 264 are members that separate the positive electrode sheet 220 and the negative electrode sheet 240. In the example under consideration, the separators 262 and 264 are constructed of a strip-shaped sheet of prescribed width and having a plurality of microfine pores. A separator having a single-layer structure or a separator having a laminate structure can be used for the separators 262 and 264. The single-layer separator and the laminate separator can be made, for example, of a porous polyolefin resin. A porous layer of insulating particles may be formed on the surface of a porous resin sheet for the separator. These insulating particles may be composed of an insulating inorganic filler (for example, a filler such as a metal oxide (e.g., alumina) or a metal hydroxide). As shown in FIG. 2 and FIG. 3, in this example the width $b_1$ of the negative electrode active material layer 243 is a little larger than the width $a_1$ of the positive electrode active material layer 223. The widths $c_1$ and $c_2$ of the separators 262 and 264 are also a little larger than the width $b_1$ of the negative electrode active material layer 243. Thus, $c_1$, $c_2$, $b_1$, and $a_1$ satisfy the following relationship: $c_1, c_2 > b_1 > a_1$.

The wound electrode assembly 200 is an electrode assembly provided by stacking the positive electrode sheet 220 and the negative electrode sheet 240 while interposing the separators 262 and 264 between the positive electrode active material layer 223 and the negative electrode active material layer 243 and winding. As shown in FIG. 2 and FIG. 3, in this embodiment the positive electrode sheet 220, the negative electrode sheet 240, and the separators 262 and 264 are aligned in the length direction and stacking is carried out in sequence, positive electrode sheet 220, separator 262, negative electrode sheet 240, and separator 264. While this embodiment is configured with the separators 262 and 264 interposed, stacking is performed so the negative electrode active material layer 243 covers the positive electrode active material layer 223. In addition, the negative electrode current collector 241 and the positive electrode current collector 221 are stacked so the active material layer-free regions 242 and 222 project out at opposite sides from each other in the direction of the winding axis of the wound electrode assembly 200. The purpose of stacking the negative electrode current collector 241 and the positive electrode current collector 221 in this manner is to raise the current collection performance. The thusly stacked sheets (for example, the positive electrode sheet 220) are wound around the winding axis WL.

The wound electrode assembly 200 is attached to the electrode terminals 420 and 440, which are themselves attached to the battery case 300 (to the lid 340 in this example). The wound electrode assembly 200 is pressed flat in one direction orthogonal to the winding axis WL and in this state is housed in the battery case 300. In addition, the active material layer-free region 222 of the positive electrode sheet 220 and the active material layer-free region 242 of the negative electrode sheet 240 in the wound electrode assembly 200 project out toward opposite sides to each other in the direction of the winding axis. One electrode terminal 420 is fixed to the active material layer-free region 222 of the positive electrode current collector 221. The other electrode terminal 440 is fixed to the active material layer-free region 242 of the negative electrode current collector 241. This wound electrode assembly 200 is housed in the flat interior space of the case main body 320. After the wound electrode assembly 200 has been inserted, the case main body 320 is closed by the lid 340.

Electrolyte solutions that are the same as the nonaqueous electrolyte solutions heretofore used in lithium ion secondary batteries can be used without particular limitation as the electrolyte solution (nonaqueous electrolyte solution). These nonaqueous electrolyte solutions typically have a composition in which a supporting salt is incorporated in a suitable nonaqueous solvent. This nonaqueous solvent can be exemplified by one or two or more selections from the group consisting of ethylene carbonate, propylene carbonate, dimethyl carbonate, diethyl carbonate, ethyl methyl carbonate, 1,2-dimethoxyethane, 1,2-diethoxyethane, tetrahydrofuran, 1,3-dioxolane, and so forth. A lithium salt can be used as the supporting salt. The lithium salt can be exemplified by $LiPF_6$, $LiBF_4$, $LiAsF_6$, $LiCF_3SO_3$, $LiC_4F_9SO_3$, $LiN(CF_3SO_2)_2$, and $LiC(CF_3SO_2)_3$. The electrolyte solution can be exemplified by a nonaqueous electrolyte solution in which $LiPF_6$ is incorporated at a concentration of approximately 1 mol/L in a mixed solvent of ethylene carbonate and diethyl carbonate (for example, in a mass ratio of 1:1).

A gas generator may be incorporated in the nonaqueous electrolyte solution. This gas generator, for example, reacts and generates gas when the battery voltage reaches or exceeds a pre-established voltage. For example, cyclohexylbenzene (CHB) and/or biphenyl (BP) can be used as this gas generator. With CHB and BP, a polymerization reaction is activated at an overcharge of about 4.35 V to 4.6 V, causing the generation of a gas (hydrogen gas in this case). The amount of addition of the gas generator with reference to the nonaqueous electrolyte solution is preferably, for example, approximately from at least 0.05 weight % to not more than 4.0 weight %. However, the amount of gas generator addition is not limited to this and may be adjusted to produce a prescribed amount of gas under pre-established conditions.

As indicated above, a gas generator is added to the electrolyte solution in this lithium ion secondary battery 100. Due to this, when an overcharge of approximately 4.35 V to 4.6 V occurs, a gas is generated and the pressure within the battery case rises. The current interrupt mechanism 460 is a mechanism that interrupts the current path when the pressure within the battery case has undergone an abnormal increase. In this embodiment, the current interrupt mechanism 460, as shown in FIG. 1, is constructed on the inner side of the positive electrode terminal 420 in order to break the conduction path for the battery current at the positive electrode.

Figure 4:
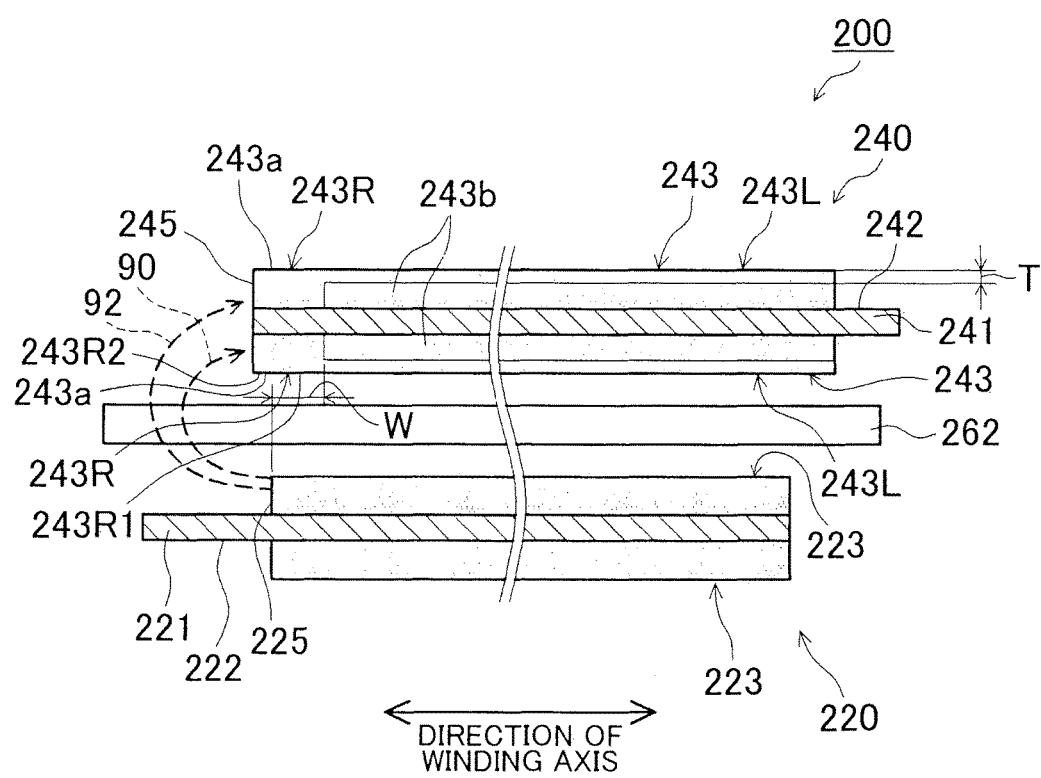
FIG. 4 is a cross-sectional diagram that shows the positive electrode sheet/negative electrode sheet laminate structure of the wound electrode assembly in a lithium ion secondary battery according to an embodiment of the invention.
Figure 5:
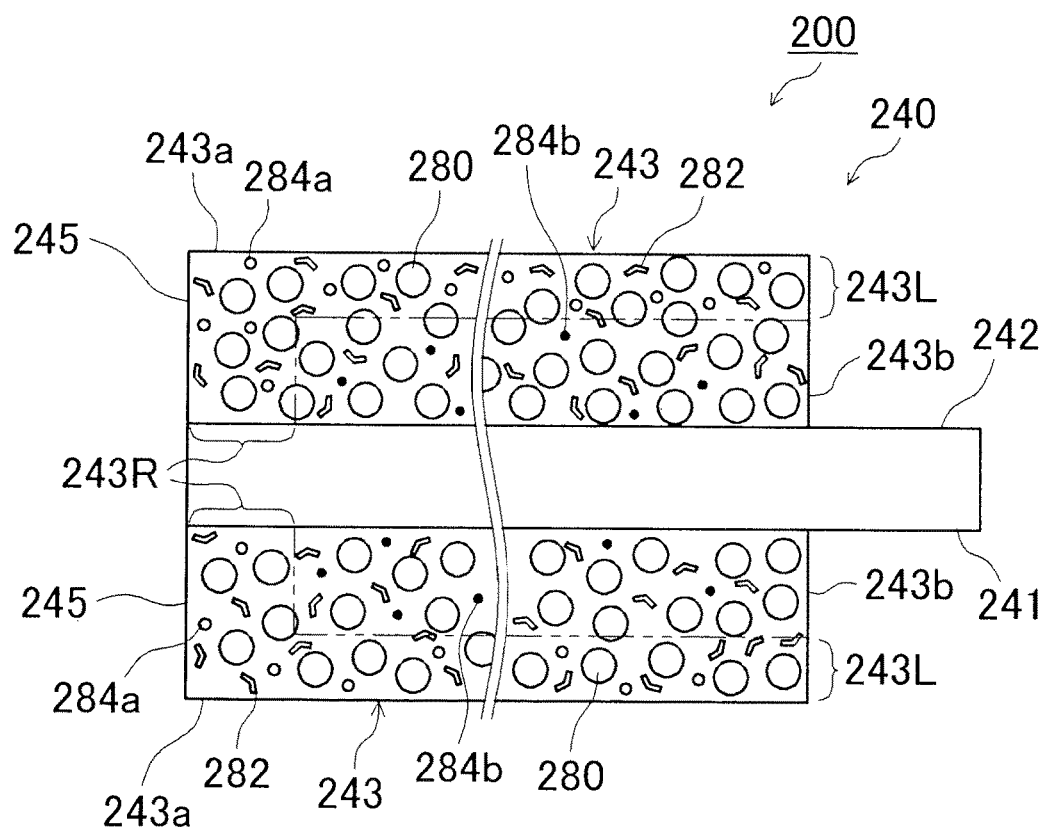
FIG. 5 is a schematic diagram that shows the cross section of a negative electrode sheet according to an embodiment of the invention.

The negative electrode sheet 240 of the lithium ion secondary battery 100 is more particularly described in the following. FIG. 4 schematically shows a cross section provided by sectioning, in the direction of the winding axis (for example, the width direction of the positive electrode sheet 220) the positive electrode sheet 220, separator 262, and negative electrode sheet 240 stacked together in the wound electrode assembly 200. FIG. 5 is a schematic diagram that shows the cross section of the negative electrode sheet 240.

As shown in FIG. 4, the herein disclosed lithium ion secondary battery 100 is provided with a wound electrode assembly 200 in which a positive electrode sheet 220, a negative electrode sheet 240, and a separator 262 have been stacked together and wound. The positive electrode sheet 220 is provided with a positive electrode active material layer 223 on a long positive electrode current collector 221. The negative electrode sheet 240 is provided with a negative electrode active material layer 243 on a long negative electrode current collector 241. The separator 262 is interposed between the positive electrode sheet 220 and the negative electrode sheet 240. The negative electrode current collector 241 has an active material layer-free region 242, where the negative electrode active material layer 243 is not formed, at one edge, of the negative electrode current collector 241 in the winding direction of the axis of the wound electrode assembly 200. In addition, the positive electrode current collector 221 has an active material layer-free region 222, where the positive electrode active material layer 223 is not formed, at one edge of the positive electrode current collector 221. The negative electrode current collector 241 and the positive electrode current collector 221 are disposed with these active material layer-free regions 222 and 242 projecting out toward opposite sides to each other in the winding direction of the axis. The negative electrode active material layer 243 is wider than the positive electrode active material layer 223.

As shown in FIG. 5, the negative electrode active material layer 243 in the herein disclosed negative electrode sheet 240 contains a negative electrode active material 280, a binder 282, and celluloses 284a and 284b. The celluloses 284a and 284b function as thickeners for the negative electrode mixture. A bacterial cellulose 284a is, provided in the surface layer 243a of the negative electrode active material layer 243 that faces the active material layer-free region 222 (FIG. 4) of the positive electrode current collector 221 (FIG. 4).

In this embodiment, a bacterial cellulose' layer 243L is formed over the whole area of the surface layer of the negative electrode active material layer 243. The bacterial cellulose layer 243L contains the negative electrode active material 280, the binder 282, and the bacterial cellulose 284a. In addition, a bacterial cellulose-containing region 243R is formed at the edge, in the width direction of the negative electrode active material layer 243, of the negative electrode active material layer 243 on the side where the active material layer-free region 242 is not formed. This bacterial cellulose-containing region 243R contains the negative electrode active material 280, the binder 282, and the bacterial cellulose 284a. The region 243b that is outside the preceding contains the negative electrode active material 280, the binder 282, and a CMC 284b. Thus, in this embodiment, within the negative electrode active material layer 243 the bacterial cellulose 284a is used in the bacterial cellulose layer 243L of the surface layer and in the bacterial cellulose-containing region 243R at the edge. The CMC 284b, on the other hand, is used in the region 243b that is outside the preceding.

This bacterial cellulose refers to any cellulose produced by a microorganism (typically bacteria such as the acetic acid bacteria). Bacterial cellulose has a fiber diameter of, for example, 10 nm to 100 nm, which is one one-hundredth to one ten-thousandth that of cellulose of plant origin. For example, when a microorganism having a bacterial cellulose-producing capability is cultured, a cellulose fiber gel is produced within the microorganism and bacterial cellulose is obtained by the discharge of the produced cellulose fibers from the microorganism. After the bacterial cellulose has been purified, the purified bacterial cellulose may be pulverized and classified to adjust the particle diameter of the bacterial cellulose to a specified particle diameter. The acetic acid bacteria are a typical example of microorganisms that have a bacterial cellulose-producing capability. Preferred examples here are *Acetobacter xylinum*, *Acetobacter aceti*, *Acetobacter rancens*, *Sarcina ventriculi*, and *Bacterium xyloides*.

The average particle diameter d of the bacterial cellulose 284a present in the bacterial cellulose layer 243L and the bacterial cellulose-containing region 243R is preferably about $0.01~\mu m \le d \le 0.25~\mu m$. When the average particle diameter d of the bacterial cellulose 284a is too small, large amounts of the binder 282 then become necessary in order to retain the shape of the negative electrode active material layer 243 and secure adhesiveness with the negative electrode current collector 241. When large amounts of the binder 282 are required, this has the potential to cause a reduction in the properties of the battery. Viewed in terms of shape retention and securing the adhesiveness, the average particle diameter d of the bacterial cellulose 284a is preferably about $0.01~\mu m \le d$, for example, more preferably $0.05~\mu m \le d$ and particularly preferably $0.08 \le d$. When, on the other hand, the average particle diameter d of the bacterial cellulose 284a is too large, the reactions become nonuniform because the surface of the bacterial cellulose layer 243L is then coarse. The properties of the battery may be impaired when the reactions are nonuniform. Viewed from this perspective, the average particle diameter d of the bacterial cellulose 284a is preferably about $d \le 0.25~\mu m$, more preferably $d \le 0.2~\mu m$, and particularly preferably $d \le 0.15~\mu m$ (for example, approximately $0.1~\mu m$). The average particle diameter d of the bacterial cellulose is, for example, the median diameter (average particle diameter $D_{50}$: 50% volume average particle diameter) derived from the particle diameter distribution measured, for example, with a particle size distribution analyzer based on laser scattering diffraction.

Within the negative electrode active material layer 243, the thickness T (FIG. 4) of the bacterial cellulose layer 243L disposed for the surface layer is not particularly limited, but about $1~\mu m \le T \le 10~\mu m$ is favorable, for example, $3~\mu m \le T \le 10~\mu m$ is more preferred and, for example, $3~\mu m \le T \le 8~\mu m$ (for example, about $5~\mu m$) is particularly preferred. When the thickness T of the bacterial cellulose layer 243L is too small, the improvement in properties due to the presence of the bacterial cellulose layer 243L is not fully realized. An improvement in the capacity retention rate post-cycling is an example of the property improvement due to the disposition of the bacterial cellulose layer 243L. When, on the other hand, the thickness T of the bacterial cellulose layer 243L is too large, the battery resistance may assume an increasing trend. The thickness of the bacterial cellulose layer 243L may be evaluated, for example, through the approximate average value obtained by measuring the thickness at five or more randomly selected locations on the scanning electron microscope (SEM) image of the bacterial cellulose layer 243L.

There are no particular limitations on the width W of the bacterial cellulose-containing region 243R within the negative electrode active material layer 243. The width W of the bacterial cellulose-containing region 243R is provided in the region opposite from the active material layer-free region 222 of the positive electrode current collector 221. In this embodiment, the width of the negative electrode active material layer 243 in the lithium ion secondary battery 100 is greater than that of the positive electrode active material layer 223. In this case, the negative electrode active material layer 243 has a 243R1 and a 243R2. This 243R1 is a region, in the bacterial cellulose-containing region 243R, that faces the positive electrode active material layer 223. The 243R2 is a region that does not face the positive electrode active material layer 223. In this case, within the bacterial cellulose-containing region 243R, the width W of the region 243R1 that faces the positive electrode active material layer 223 is preferably about 1 mm≤W≤3 mm, more preferably 1.5 mm≤W≤3 mm, and particularly preferably 1.5 mm≤W≤2.5 mm (for example, 2 mm).

Bacterial cellulose 284a is provided in the surface layer 243a of the negative electrode active material layer 243 in the herein disclosed lithium ion secondary battery 100. Through this incorporation of bacterial cellulose 284a in the surface layer 243a of the negative electrode active material layer 243, the nanosize microfine indentation of the bacterial cellulose 284a inhibits deformation (e.g., buckling) of the wound electrode assembly 200 due to expansion/contraction during charge/discharge. This suppresses deformation of the wound electrode assembly 200 even during repetitive charge/discharge of the lithium ion secondary battery. The deterioration in the properties of the lithium ion secondary battery caused by deformation of the wound electrode assembly 200 (for example, a reduction in the capacity retention rate post-cycling) is mitigated as a consequence.

The bacterial cellulose layer 243L containing bacterial cellulose 284a is formed over the whole area of the surface layer of the negative electrode active material layer 243. This structure can inhibit Li precipitation during low temperatures and high output. That is, the bacterial cellulose layer 243L containing bacterial cellulose 284a has a high ability to absorb and retain the electrolyte solution and the lithium can then be maintained unchanged in the ionic state. The appearance of Li precipitation during low temperatures and high output can be inhibited because this bacterial cellulose layer 243L functions as a buffer that temporarily stores the lithium ion. In addition, when the battery enters into an overcharged state, electrolyte solution trafficking between the negative electrode active material layer 243 and the positive electrode active material layer 223 proceeds smoothly through the highly liquid-retentive bacterial cellulose layer 243L. As a consequence, gas generation by the gas generator can proceed smoothly and the amount of gas generation by the gas generator can then be favorably ensured. The current interrupt mechanism can operate in a suitable manner as a result.

The bacterial cellulose-containing region 243R containing the bacterial cellulose 284a is formed at the edge of the negative electrode active material layer 243 on the side in the winding direction of the axis, where the active material layer-free region 242 is not formed. Elution of the metal (and thus its precipitation at the negative electrode) in the positive electrode active material during high-temperature storage can be inhibited by this construction. Thus, in the lithium ion secondary battery 100 under consideration, the negative electrode current collector 241 has an active material layer-free region 242 at one edge of the negative electrode current collector 241 in the winding direction of the axis of the wound electrode assembly. In addition, the positive electrode current collector 221 has an active material layer-free region 222 at one edge of the positive electrode current collector 221. Moreover, the negative electrode current collector 241 and the positive electrode current collector 221 are wound with these active material layer-free regions 222 and 242 disposed projecting out at opposite sides from each other in the direction of the winding axis. In this case, the negative electrode current collector 241 is not present at the edge 245 of the negative electrode active material layer 243 on the side where the active material layer-free region 242 is not formed. Due to this, it is thought that the lithium ion released from the positive electrode active material layer 223 diffuses not only to the negative electrode active material layer 243 facing the positive electrode active material layer 223 (refer to the arrow 90 in FIG. 4), but also to the negative electrode active material layer 243 residing on the opposite side of the negative electrode current collector 241 (refer to the arrow 92 in FIG. 4). When this occurs, a trend of an increased amount of lithium ion release during charging, in comparison to other locations, can be produced at the edge 225 of the positive electrode active material layer 223 proximal to the edge 245 of the negative electrode active material layer 243 on the side where the active material layer-free region 242 is not formed. Due to this, a local increase in the potential can occur at the edge 225 of the positive electrode active material layer 223. Long-term storage in a high-temperature environment in a state in which a substantial local increase has occurred in the potential at the edge 225 of the positive electrode active material layer 223 can be a factor that causes elution of the metal (e.g., transition metal) present in the positive electrode active material layer 223.

In contrast to this, in the herein disclosed lithium ion secondary battery 100, the bacterial cellulose-containing region 243R is formed at the edge of the negative electrode active material layer 243 on the side where the active material layer-free region 242 is not formed. According to the understanding of the inventor, within the negative electrode active material layer 243, lithium ion diffusion tends to be more difficult in the region containing the bacterial cellulose 284a than in the region 243b containing CMC 284b. In the herein disclosed lithium ion secondary battery 100, in the negative electrode active material layer 243 the bacterial cellulose-containing region 243R is formed at the edge 245 of the negative electrode active material layer 243 on the side where the active material layer-free region 242 is not formed. Due to this, lithium ion diffusion is more difficult at the edge 245 of the negative electrode active material layer 243 on the side where the active material layer-free region 242 is not formed, than at the CMC-containing region 243b containing CMC 284b. As a consequence, the appearance of an excessive release of the lithium ion is more difficult at the edge 225 of the positive electrode active material layer 223 proximal to the edge 245 of the negative electrode active material layer 243, than for the positive electrode active material layer 223 as a whole outside of this edge 225. In addition, a relaxation occurs in the local increase in potential at the edge 225 of the positive electrode active material layer 223 that is caused by an excessive release of the lithium ion from the edge 225 of the positive electrode active material layer 223. As a result, the metal elution at the edge 225 of the positive electrode active material layer 223 that can occur during high-temperature storage in a near-full charge state can be inhibited.

The bacterial cellulose layer 243L and the bacterial cellulose-containing region 243R and the CMC-containing region 243b outside these may be formed in the negative electrode active material layer 243 by using different mixtures. For example, a first mixture for forming the bacterial cellulose layer 243L and the bacterial cellulose-containing region 243R and a second mixture for forming the CMC-containing region 243b outside these may be prepared. The first mixture contains a bacterial cellulose 284a. The second mixture contains a CMC 284b. A portion of, the negative electrode active material layer 243 is formed on the surface of the negative electrode current collector 241 by coating the first mixture on the area of the negative electrode current collector 241 where the bacterial cellulose-containing region 243R is to be formed, and drying. This portion becomes the bacterial cellulose-containing region 243R of the negative electrode active material layer 243. A portion of the negative electrode active material layer 243 is also formed on the surface of the negative electrode current collector 241 by coating the second mixture in a strip on the remaining area in the length direction of the negative electrode current collector 241, and drying. This portion becomes the CMC-containing region 243b. In addition, a portion of the negative electrode active material layer 243 is formed by coating the first mixture over the entire area so as to overlay the bacterial cellulose-containing region 243R and the CMC-containing region 243B, and drying. This portion becomes the bacterial cellulose layer 243L.

Figure 6:
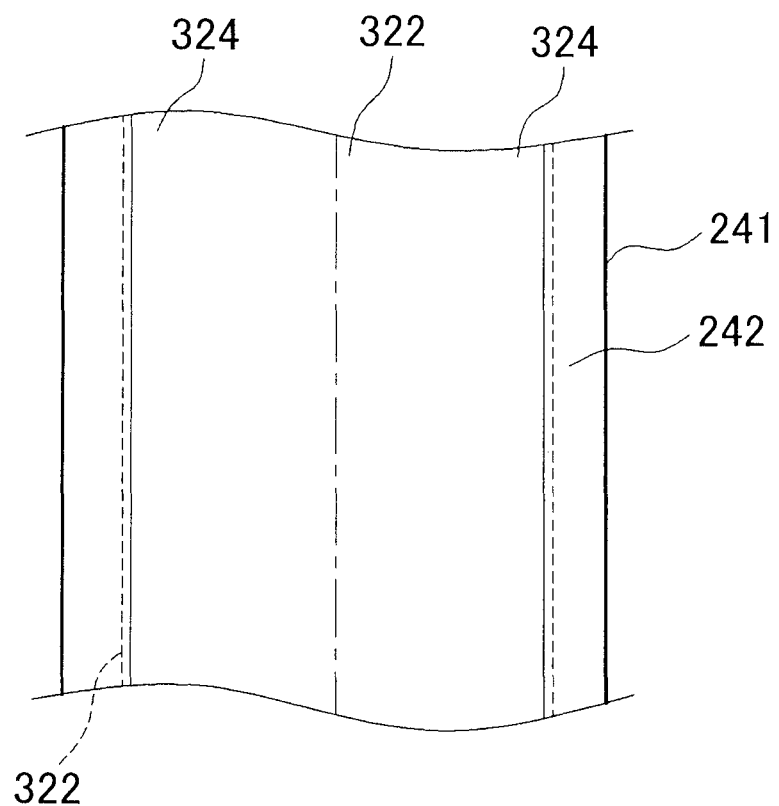
FIG. 6 is a diagram that shows an example of a coating pattern.

As shown in FIG. 6, preferably a line of the negative electrode mixture coating film is formed on a sheet of the negative electrode current collector 241 in the length direction and a slit is formed in the center of the resulting coating film (the position of slit formation is shown by the long-dash short-dash line in FIG. 6). Two sheets of the negative electrode sheet 240 can be produced by cutting the negative electrode current collector 241 at this slit. In this case, a first mixture 322, which will form the bacterial cellulose-containing region 243R, may be coated on the area of the negative electrode current collector 241 where the bacterial cellulose-containing region 243R is to be formed (i.e., the central area in the width direction of the negative electrode current collector 241). In addition, a second mixture 324, which will form the CMC-containing region 243b, can be coated on the remaining area in the longitudinal direction of the negative electrode current collector 241, but leaving a strip for the active material layer-free region 242 of the negative electrode current collector 241. In order to form the bacterial cellulose layer 243L, the first mixture 322 can also be coated over the entire area so as to overlay the coated areas indicated above (the dashed line in FIG. 6). After these coated areas have been dried, the negative electrode current collector 241 may be cut at the slit (the long-dash short-dash line in FIG. 6) using a cutting device that is not shown to partition out two sheets of the negative electrode sheet 240 that may be used.

The inventor carried out tests in order to evaluate the functional effects of this negative electrode sheet 240. As shown in FIG. 1 to FIG. 4, the lithium ion secondary battery used in these tests is provided with a positive electrode sheet 220, in which a positive electrode active material layer 223 is formed on both sides of a positive electrode current collector 221, and with a negative electrode sheet 240, in which a negative electrode active Material layer 243 is formed on both sides of a negative electrode current collector 241. The negative electrode active material layer 243 is formed with an active material layer-free region 242 disposed at one edge of the negative electrode current collector 241 and with an active material layer-free region 242 substantially not disposed at the other edge. In addition, as shown in FIG. 5, within the negative electrode active material layer 243, a bacterial cellulose-containing region 243R containing a bacterial cellulose 284a is provided at the edge 245 on the side where the active material layer-free region 242 is not formed. A bacterial cellulose layer 243L containing a bacterial cellulose 284a is also provided over the whole area of the surface layer of the negative electrode active material layer 243. On the other hand, a CMC-containing region 243b that uses CMC 284b is disposed over the entire area of the negative electrode active material layer 243 excluding the bacterial cellulose-containing region 243R and the bacterial cellulose layer 243L.

In these examples, the positive electrode active material layer 223 is provided over the entire area of the positive electrode current collector 221 excluding the active material layer-free region 222 that is provided as a strip at one edge in the length direction. The negative electrode active material layer 243 is wider than the positive electrode active material layer 223. In addition, the negative electrode current collector 241 and the positive electrode current collector 221 are wound disposed in a state in which the negative electrode active material layer 243 covers the positive electrode active material layer 223 and in which the active material layer-free regions 222 and 242 project out at opposite sides from each other in the winding direction of the axis. As a consequence, as shown in FIG. 4 the negative electrode active material layer 243 has, in the bacterial cellulose-containing region 243R, a region 243R1 that faces the positive electrode active material layer 223 and a region 243R2 that does not face the positive electrode active material layer 223: W refers to the width, in the bacterial cellulose-containing region 243R of the negative electrode active material layer 243, of the region 243R1 that faces the positive electrode active, material layer 223. The thickness of the bacterial cellulose layer 243L provided for the surface layer of the negative electrode active material layer 243 is T.

A plurality of samples were formed for the negative electrode sheet 240 using different particle diameters d for the bacterial cellulose (lump aggregate) 284a, different widths W for the 243R1 region facing the positive electrode active material layer 223 of the bacterial cellulose-containing region 243R, and different thicknesses T of the bacterial cellulose layer 243L.

A graphite powder was used as the negative electrode active material, styrene-butadiene copolymer (SBR) was used as the binder, and water was used as the solvent in the mixture for forming the negative electrode active material layer 243. Cellulose was also prepared as the thickener. The weight proportions among the negative electrode active material, the SBR, and the CMC were negative electrode active material:SBR:cellulose=100:1:1. This mixture was coated on copper foil (thickness=14 µm) as the negative electrode current collector 241 followed by drying and rolling to form a negative electrode sheet 240. The amount of application of the negative electrode composite was adjusted to provide approximately 140 mg/cm$^2$ (solids basis) for both sides combined. The overall negative electrode sheet 240 had a thickness of 150 µm, a length of 4700 mm, and a coated width for the negative electrode active material layer 243 of 100 mm.

This negative electrode active material layer 243 was formed using different mixtures for the bacterial cellulose-containing region 243R and bacterial cellulose layer 243L and the CMC-containing region 243b outside these. Thus, a first mixture was prepared in order to form the bacterial cellulose-containing' region 243R and the bacterial cellulose layer 243L and a second mixture, was prepared in order to form the CMC-containing region outside these. Bacterial cellulose 284a was incorporated as the thickener in the first mixture. CMC 284b was incorporated as the thickener in the second mixture. The first mixture was coated in the region where the bacterial cellulose-containing region 243R of the negative electrode current collector 241 was to be formed. The second mixture was coated as a strip on the remaining area in the length direction of the negative electrode current collector 241. The first mixture was also coated over the whole to overlay the coated regions indicated above. The coated regions were then dried to form the negative electrode active material layer 243 on the surface of the negative electrode current collector 241.

A bacterial cellulose produced by acetic acid bacteria was used as the bacterial cellulose 284a. The bacterial cellulose aggregate (lump) was pulverized and classified to obtain bacterial celluloses 284a having different average particle diameters.

The thickness T (refer to FIG. 4) of the bacterial cellulose layer 243L is varied in Examples 1 to 3, 8, and 9. With the exception of the thickness T of the bacterial cellulose layer 243L, the other features in Examples 1 to 3, 8, and 9 were the same.

Production in Examples 4, 5, 10, and 11 was carried out as in Example 2, but using different widths W (refer to FIG. 4) for the region 243R1, which faced the positive electrode active material layer 223, of the bacterial cellulose-containing region 243R.

In Example 6, the particle diameter d of the bacterial cellulose 284a was 0.25 μm and the thickness T of the bacterial cellulose layer 243L was 10 μm. Except for these features, Example 6 had the same construction as in Example 2.

In Example 7, the particle diameter d of the bacterial cellulose 284a was 0.01 μm and the thickness T of the bacterial cellulose layer 243L was 1 μm. Except for these features, Example 7 had the same construction as in Example 2.

In Example 12, the particle diameter d of the bacterial cellulose 284a was 0.005 μm and the thickness T of the bacterial cellulose layer 243L was 1 μm. The width W of the region 243R1, which faced the positive electrode active material layer 223, of the bacterial cellulose-containing region 243R was 1 mm. Except for these features, Example 12 had the same construction as in Example 2.

In Example 13, the particle diameter d of the bacterial cellulose 284a was 0.28 μm and the thickness T of the bacterial cellulose layer 243L was 10 μm. The width W for the region 243R1, which faced the positive electrode active material layer 223, of the bacterial cellulose-containing region 243R was 3 mm. Except for these features, Example 13 had the same construction as in Example 2.

A bacterial cellulose layer 243L was not formed in Example 14 (i.e., the value of T was 0 μm). Except for this feature, Example 14 had the same construction as in Example 2.

In Example 15, the width W for the region 243R1, which faced the positive electrode active material layer 223, of the bacterial cellulose-containing region 243R was 0 mm and the thickness T of the bacterial cellulose layer 243L was 1 μm. Except for these features, Example 15 had the same construction as in Example 2.

The negative electrode sheet in Example 16 was conventionally fabricated by also using CMC for the bacterial cellulose-containing region 243R and the bacterial cellulose layer 243L.

The positive electrode sheet 220 was produced as follows. A positive electrode mixture was prepared by adding 100 mass parts of a lithium nickel cobalt manganate ($LiNi_{1/3}Co_{1/3}Mn_{1/3}O_2$) powder as the positive electrode active material, 5 mass parts of AB as an electroconductive material, and 2 mass parts of PVdF as binder to N-methylpyrrolidone (NMP). The thusly prepared positive electrode mixture was coated in a strip on both sides of a long sheet-shaped aluminum foil (positive electrode current collector, thickness=15 μm) and dried to produce a positive electrode sheet 220 having a positive electrode active material layer 223 provided on both sides of the positive electrode current collector 221. The amount of applying the positive electrode mixture was adjusted to 30 mg/cm$^2$ (on a solid, basis) for the both sides of the positive electrode current collector 221. The overall positive electrode sheet 220 had a thickness of 170 μm, a length of 4500 mm, and a coated width for the positive electrode active material layer 223 of 94 mm.

A winding was produced by winding this positive electrode sheet 220 and negative electrode sheet 240 with two sheets of a separator 262 and 264 interposed therebetween. This winding was flattened from the side by pressing with platens for 2 minutes at a pressure of 4 kN/cm$^2$ to produce a flat wound electrode assembly 200. The thusly obtained wound electrode assembly 200 was housed in a battery case 300 (a rectangular shape was used in this instance) along with a nonaqueous electrolyte (a nonaqueous electrolyte solution) and the opening on the battery case 300 was sealed gastight. A porous film (thickness=20 μm) having a three-layer structure of polypropylene (PP), polyethylene (PE), and PP and having a porous layer of alumina particles formed on its surface was used for the separators 262 and 264. The electrolyte solution used was prepared by blending ethylene carbonate, dimethyl carbonate, and ethyl methyl carbonate in a volumetric ratio of 0.3:4:3 and dissolving 1 mol $LiPF_6$. 1 mass % CHB and 1 mass % BP were added to the electrolyte solution.

Each of the test lithium ion secondary batteries obtained in Examples 1 to 16 was charged at a temperature of 25° C. to a voltage of 4.1 V at a current value of 1 C. After a pause of 5 minutes, the thusly charged battery was discharged at 25° C. to a voltage of 3.0 V at a current value of 1 C. After a pause of 5 minutes, charging to a voltage of 4.1 V was performed at a current value of 1 C followed by charging by a constant-voltage procedure until the current value fell to 0.1 C. The thusly charged battery was then discharged at 25° C. to a voltage of 3.0 V at a current value of 1 C. This was followed by discharge by a constant-voltage procedure until the current value fell to 0.1 C. The discharge capacity when this was done was taken to be the initial capacity (rated capacity). The initial capacity of the test lithium ion secondary batteries was made 24 Ah in this case.

After this measurement of the initial capacity, the test lithium ion secondary battery in each example was subjected to cycle testing by the application of a charge/discharge pattern in which CC charge/discharge at 2 C was repeated. Specifically, the following charge/discharge cycle was continuously repeated 1000 times in an approximately 50° C. environment: charge to 4.1 V by 2 C constant-current charging, discharge to 3.0 V by 2 C constant-current discharge. The capacity retention rate was calculated from the initial capacity and the capacity after the charge/discharge cycle test. The capacity after the charge/discharge cycle test was measured as for the "measurement of the initial capacity". The capacity retention rate was determined from "bat- The results of these tests for the individual examples are given in Table 1.

TABLE 1

| example | particle diameter (μm) | T value (μm) | W value (mm) | capacity retention rate after cycling (%) | resistance (mΩ) | 0° C. capacity retention rate (%) | capacity retention rate after high temperature storage (%) | number of operations of the current interrupt device (no./10 cells) |
|---|---|---|---|---|---|---|---|---|
| 1 | 0.1 | 1.0 | 2.0 | 89.9 | 3.0 | 79.2 | 97.4 | 10 |
| 2 | 0.1 | 5.0 | 2.0 | 90.1 | 3.1 | 79.2 | 97.5 | 10 |
| 3 | 0.1 | 10.0 | 2.0 | 90.2 | 3.1 | 79.1 | 97.7 | 10 |
| 4 | 0.1 | 5.0 | 1.0 | 89.7 | 3.1 | 79.1 | 97.4 | 10 |
| 5 | 0.1 | 5.0 | 3.0 | 89.8 | 3.1 | 79.0 | 97.4 | 10 |
| 6 | 0.25 | 10.0 | 2.0 | 89.7 | 3.1 | 79.0 | 97.4 | 10 |
| 7 | 0.01 | 1.0 | 2.0 | 89.7 | 3.1 | 79.0 | 97.4 | 10 |
| 8 | 0.1 | 0.5 | 2.0 | 83.2 | 3.0 | 79.0 | 87.6 | 5 |
| 9 | 0.1 | 12.0 | 2.0 | 84.5 | 3.7 | 63.2 | 97.3 | 10 |
| 10 | 0.1 | 5.0 | 0.7 | 88.6 | 3.1 | 79.0 | 64.3 | 10 |
| 11 | 0.1 | 5.0 | 3.2 | 87.5 | 3.8 | 62.1 | 97.2 | 10 |
| 12 | 0.005 | 1.0 | 1.0 | 83.4 | 3.6 | 63.7 | 97.5 | 10 |
| 13 | 0.28 | 10.0 | 3.0 | 82.9 | 3.1 | 79.2 | 64.5 | 5 |
| 14 | 0.1 | 0 | 2.0 | 82.9 | 3.0 | 79.1 | 62.0 | 4 |
| 15 | 0.1 | 1.0 | 0 | 82.4 | 3.0 | 79.2 | 62.1 | 5 |
| 16 | — | 0 | 0 | 82.1 | 3.0 | 79.2 | 62.1 | 5 | tery capacity after the charge/discharge cycle test/initial capacity"×100. This test was run on 5 batteries for each example and the average value of these results was calculated.

The state of charge (SOC) of the test lithium ion secondary battery from each example was adjusted to a SOC that was approximately 50% of the initial capacity (50% SOC). After this, the following charge/discharge cycle was continuously repeated 50,000 times at a temperature of 0° C.: CC discharge at 20 C for 10 seconds and CC charge at 20 C for 10 seconds. The battery capacity after this 0° C. pulse cycling was measured under the same conditions as for the initial capacity and the capacity retention rate after 0° C. pulse cycling was determined from [(battery capacity after 0° C. pulse cycling)/(initial capacity)]×100(%).

The SOC of the test lithium ion secondary battery from each example was adjusted to a SOC that was approximately 60% of the initial capacity (60% SOC). After this, discharge was performed for 10 seconds at a 10 C current value in a 25° C. atmosphere and the voltage value 10 seconds after the start of discharge was measured and the IV resistance was calculated. This battery resistance was run on 10 batteries from each example and the average value was calculated.

The SOC of the test lithium ion secondary battery from each example was adjusted to a SOC that was approximately 100% of the initial capacity (100% SOC). This was followed by placement in a 60° C. thermostat and high-temperature ageing for 100 days. The battery capacity after high-temperature storage was measured under the same conditions as for the initial capacity, and the capacity retention rate after high-temperature storage was calculated from [(battery capacity after high-temperature storage)/(initial capacity)]×100(%). This test was run on 50 batteries for each example and the average value was calculated.

Test lithium ion secondary batteries from each example were charged to 20 V at a constant current of 24 A (corresponds to 1 C) in a 60° C. thermostat to establish an overcharged state. The operation/non-operation of the current-interrupt mechanism was checked based on the change in the battery voltage. This test was run on 10 batteries from each example.

As shown in Table 1, bacterial cellulose 284a is provided in at least the surface layer 243a of the negative electrode active material layer 243 facing the active material layer-free region 222 of the positive electrode current collector 221 in Examples 1 to 15. In comparison to Example 16, which lacked bacterial cellulose 284a, Examples 1 to 15 exhibited an excellent capacity retention rate post-cycling and thus a very high durability. These results confirmed that the durability of a lithium ion secondary battery can be improved by providing bacterial cellulose 284a in at least the surface layer 243a of the negative electrode active material layer 243 facing the active material layer-free region 222 of the positive electrode current collector 221.

The thickness T (FIG. 4) of the bacterial cellulose layer 243L varies among Examples 1 to 3, 8, and 9. The thickness T of the bacterial cellulose layer 243L is in the range 1 μm≤T≤10 μm in Examples 1 to 3. Extremely good results were obtained in Examples 1 to 3, where the capacity retention rate after cycling was at least 89%. Examples 1 to 3 thus had a better durability than Example 8 (thickness T: 0.5 μm). The capacity retention rate after high-temperature storage was also improved in Examples 1 to 3 over that in Example 8. The hypothesis here is that the bacterial cellulose layer 243L in Example 8 was too thin and the battery properties were diminished as a result due to a depletion of the electrolyte solution during cycling and/or due to the precipitation of positive electrode active material metal during high-temperature storage. The number of operations of the current-interrupt mechanism during overcharging was also less in Example 8 than in Examples 1 to 3. The hypothesis here is that, during overcharging in Example 8, metal from the positive electrode active material eluted and engaged in secondary reactions with the gas generator (CHB and BP) in the electrolyte solution, resulting in consumption of the gas generator and an inadequate gas generation. Based on these results, the thickness T of the bacterial cellulose layer 243L is preferably about 0.5 μm<T and, for example, 1 μm≤T is more preferred.

In addition, the capacity retention rate after cycling and the 0° C. capacity retention rate were both better in Examples 1 to 3, which had 1 μm≤T≤10 μm, than in Example 9 (thickness T: 12 µm), and lower values for the battery resistance were obtained as well. It is hypothesized that the electrode resistance was increased in Example 9 because the bacterial cellulose layer 243L was too thick. It is also hypothesized that the capacity retention rate after cycling and the 0° C. capacity retention rate were reduced due to the high-resistance electrode. Based on these results, the thickness T of the bacterial cellulose layer 243L is preferably T<12 µm and is more preferably T≤10 µm.

The width W (FIG. 4) for the region 243R1 facing the positive electrode active material layer 223, of the bacterial cellulose-containing region 243R varies among Examples 2, 4, 5, 10, and 11. This width W for the region 243R1 facing the positive electrode active material layer 223, of the bacterial cellulose-containing region 243R is in the range 1 mm≤W≤3 mm in Examples 2, 4, and 5. The results in Examples 2, 4, and 5 of at least 97% for the capacity retention rate after high-temperature storage were extremely good. Examples 2, 4, and 5 thus have a better high-temperature durability than Example 10 (width W: 0.7 mm). The hypothesis here is that the battery characteristics were lower in Example 10 due to the precipitation of positive electrode active material metal during high-temperature storage, which occurred because the width of the bacterial cellulose-containing region 243R was too narrow. Based on these results, the width W for the region 243R1 facing the positive electrode active material layer 223, of the bacterial cellulose-containing region 243R is preferably 0.7 mm<W and is more preferably 1 mm≤W.

Examples 2, 4, and 5, for which 1 mm≤W≤3 mm, also had a better 0° C. capacity retention rate, as well as a lower value for the battery resistance, than did Example 11 (width W: 3.2 mm). The hypothesis here is that, because the bacterial cellulose-containing region 243R was too wide in Example 11, the shape retention of the negative electrode active material layer 243 and its adhesiveness with the negative electrode current collector 241 were inadequate and the electrode resistance was then increased. It is also hypothesized that the 0° C. capacity retention rate was reduced due to the high resistance electrode. Based on these results, the width W for the region 243R1 facing the positive electrode active material layer 223, of the bacterial cellulose-containing region 243R is preferably W<3.2 mm and is more preferably W≤3 mm.

The particle diameter d of the bacterial cellulose 284a was varied in Examples 2, 6, 7, 12, and 13. The particle diameter d of the bacterial cellulose 284a is in the range 0.01 µm≤d≤0.25 µm in Examples 2, 6, and 7. Very good results, of at least 79%, were obtained in Examples 2, 6, and 7 for the 0° C. capacity retention rate. The low-temperature durability is thus better in Examples 2, 6, and 7 than in Example 12 (particle diameter d: 0.005 µm). The battery resistance also presented a lower value than in Example 12. A binder deficit occurs in Example 12 because the specific surface area has been increased because the particle diameter d of the bacterial cellulose 284a is too small. The hypothesis here is that this results in an inadequate adhesiveness by the bacterial cellulose layer 243L and/or the bacterial cellulose-containing region 243R and the electrode resistance then undergoes an increase. It is also hypothesized that the electrode resistance was raised because lithium ion movement was inhibited due to the formation of a fine and dense bacterial cellulose layer 243L for the surface layer of the negative electrode active material layer 243. As a result, the particle diameter d of the bacterial cellulose 284a is preferably 0.005 µm<d and is more preferably 0.01 µm≤d.

Examples 2, 6, and 7, for which 0.01 µm≤d≤0.25 µm, had a higher capacity retention rate after cycling as well as higher values for the capacity retention, rate after high-temperature storage than did Example 13 (particle diameter d: 0.28 µm). The hypothesis here is that, because the particle diameter d of the bacterial cellulose 284a was too large in Example 13, the reactions became nonuniform due to the coarse state of the surface of the bacterial cellulose layer 243L and the battery characteristics then declined. Based on these results, the particle diameter d of the bacterial cellulose 284a is preferably d<0.28 µm and is more preferably d≤0.25 µm.

In Examples 1 to 7, the particle diameter d of the bacterial cellulose 284a is in the range 0.01 µm≤d≤0.25 µm and the thickness T of the bacterial cellulose layer 243L is in the range 1 µm≤T≤10 µm. Moreover, the width W for the region 243R1 facing the positive electrode active material layer 223, of the bacterial cellulose-containing region 243R is in the range 1 mm≤W≤3 mm. The capacity retention rate after cycling, the battery resistance, the 0° C. capacity retention rate, and the capacity retention rate after high-temperature storage were all excellent in Examples 1 to 7, and the durability characteristics were much higher than in Examples 8 to 16. The battery characteristics of lithium ion secondary batteries are thus substantially improved over a broad temperature range from low to high temperatures by having the particle diameter d of the bacterial cellulose 284a be in the range 0.01 µm≤d≤0.25 µm, having the thickness T of the bacterial cellulose layer 243L be in the range 1 µm≤T≤10 µm, and having the width W for the region 243R1 facing the positive electrode active material layer 223, of the bacterial cellulose-containing region 243R be in the range 1 mm≤W≤3 mm.

Specific examples of the invention have been particularly described in the preceding, but these are simply examples and do not limit the claims. The art described in the claims encompasses various modifications and alterations of the specific examples that have been provided as examples in the preceding.

For example, the case of the disposition of the bacterial cellulose layer 243L for the surface layer of the negative electrode active material layer 243 and the disposition of the bacterial cellulose-containing region 243R at the edge of the negative electrode active material layer 243 is used as an example in the preceding embodiments, but the invention is not limited to this. For example, only the bacterial cellulose-containing region 243R may be provided at the edge of the negative electrode active material layer 243 with the bacterial cellulose layer 243L being omitted. Or, only the bacterial cellulose layer 243L may be provided for the surface layer of the negative electrode active material layer 243 with the bacterial cellulose-containing region 243R being omitted. However, viewed from the standpoint of improving the battery properties over a broad temperature range from low temperatures to high temperatures, an embodiment is preferred, as in the embodiments described in the preceding, in which the bacterial cellulose layer 243L is provided for the surface layer of the negative electrode active material layer 243 and the bacterial cellulose-containing region 243R is provided at the edge of the negative electrode active material layer 243.

To this point, the description has concerned lithium ion secondary batteries as a typical example of secondary batteries, but there is no limitation to secondary batteries of this type. The secondary battery may be, for example, a non-aqueous electrolyte secondary battery in which the charge carrier is a metal, ion (for example, the sodium ion) other than the lithium ion, or a nickel hydride battery or a nickel cadmium battery. Moreover, the secondary battery may be an electric double-layer capacitor (a physical battery), e.g., a lithium ion capacitor provided with an electrode assembly as has been described above.

The secondary battery provided by the herein described art is highly durable with respect to charge/discharge cycling as has been described in the preceding. Due to this, it can be particularly favorably used as a power source for a motor (electric motor) installed in a vehicle such as an automobile. Accordingly, the invention provides a vehicle (typically an automobile and particularly an automobile provided with an electric motor, such as a hybrid automobile, electric automobile, and fuel cell automobile) that is provided with the secondary battery 100 (typically a battery pack in which multiple batteries are connected in series) as a power source.

The invention claimed is:

1. A secondary battery comprising:
    a wound electrode assembly in which a positive electrode sheet, a negative electrode sheet and a separator are stacked and wound, wherein
    the positive electrode sheet is provided with a long positive electrode current collector and a positive electrode active material layer, the positive electrode active material layer is disposed on the positive electrode current collector,
    the negative electrode sheet is provided with a long negative electrode current collector and a negative electrode active material layer, the negative electrode active material layer is disposed on the negative electrode current collector,
    the separator is interposed between the positive electrode sheet and the negative electrode sheet,
    the negative electrode current collector has a first active material layer-free region at one edge of the negative electrode current collector in a direction of a winding axis of the wound electrode assembly, the first active material layer-free region is a region where the negative electrode active material layer is not formed,
    the positive electrode current collector has a second active material layer-free region at one edge of the positive electrode current collector in the direction of the winding axis of the wound electrode assembly, the second active material layer-free region is a region where the positive electrode active material layer is not formed,
    the negative electrode current collector and the positive electrode current collector are disposed with the first active material layer-free region and the second active material layer-free region being projected toward opposite sides in the direction of the winding axis of the wound electrode assembly,
    a width of the negative electrode active material layer is wider than a width of the positive electrode active material layer,
    a bacterial cellulose is disposed in a bacterial cellulose layer formed over a whole area of a surface layer of the negative electrode active material layer, and
    the bacterial cellulose is further disposed in a bacterial cellulose-containing region that is formed at the edge of the negative electrode active material layer on a side where the first active material layer-free region is not formed in the direction of the winding axis of the wound electrode assembly.

2. The secondary battery according to claim 1, wherein an average particle diameter of the bacterial cellulose is larger than or equal to 0.01 μm and smaller than or equal to 0.25 μm, the average particle diameter is derived from a laser scattering/diffraction analysis of the bacterial cellulose.

3. The secondary battery according to claim 1, wherein an average thickness of the bacterial cellulose layer is larger than or equal to 1 μm and smaller than or equal to 10 μm.

4. The secondary battery according to claim 1, wherein in the bacterial cellulose-containing region, the negative electrode active material layer has a region facing the positive electrode active material layer and a region that does not face the positive electrode active material layer, and
    the width of the region facing the positive electrode active material layer is larger than or equal to 1 mm and smaller than or equal to 3 mm.

5. The secondary battery according to claim 1, further comprising:
    a battery case that houses the wound electrode assembly, a nonaqueous electrolyte solution being housed in the battery case, and the nonaqueous electrolyte solution containing a gas generator that reacts and generates a gas at or above a pre-established voltage;
    an outer terminal that is disposed in the battery case, the outer terminal being electrically connected to the electrode assembly; and
    a current-interrupt mechanism that interrupts the electrical connection between the electrode assembly and the outer terminal when an internal pressure in the battery case rises to reach or exceed a pre-established pressure.

6. The secondary battery according to claim 1, wherein the bacterial cellulose-containing region contains the negative electrode active material, the binder, and the bacterial cellulose, and
    a region of the negative electrode active material layer that is outside the bacterial cellulose-containing region contains the negative electrode active material, the binder, and a carboxymethyl cellulose.

7. The secondary battery according to claim 1, wherein the bacterial cellulose is substantially not present in the region of the negative electrode active material layer that is outside the bacterial cellulose-containing region.

8. The secondary battery according to claim 1, wherein no bacterial cellulose is present in the region of the negative electrode active material layer that is outside the bacterial cellulose-containing region.

* * * * *